United States Patent [19]

Laak

[11] Patent Number: 4,465,594

[45] Date of Patent: Aug. 14, 1984

[54] SEWAGE SYSTEM FOR THE TREATMENT OF SEGREGATED DOMESTIC WASTE WATER

[76] Inventor: Rein Laak, 149 Brown Rd., Storrs, Conn. 06268

[21] Appl. No.: 427,118

[22] Filed: Sep. 29, 1982

[51] Int. Cl.³ .............................................. C02C 1/06
[52] U.S. Cl. .................................... 210/151; 210/170; 210/630; 210/903; 210/919
[58] Field of Search ................ 210/150–151, 210/605, 610, 617–618, 630, 607, 919, 903, 170

[56] References Cited

U.S. PATENT DOCUMENTS

| | | | |
|---|---|---|---|
| 3,543,294 | 11/1970 | Boester | 210/620 |
| 3,953,327 | 4/1976 | Parker | 210/605 |
| 3,956,128 | 5/1976 | Turner | 210/150 |
| 4,017,395 | 4/1977 | Davis | 210/197 |
| 4,100,073 | 7/1978 | Hopcroft | 210/532.2 |
| 4,179,374 | 12/1979 | Savage et al. | 210/903 |

Primary Examiner—Peter A. Hruskoci
Assistant Examiner—Sharon T. Cohen
Attorney, Agent, or Firm—McCormick, Paulding and Huber

[57] ABSTRACT

Separating domestic waste water for aerobic filtration of black water and subsequently combining the filtration with grey water provides a convenient source of carbon and anaerobic matter for biological dentrification of nitrates in a filtration system of anaerobic atmosphere achieved biologically through normal decomposition. Improved filter means for the black water includes alternating layers of stone and sand, the latter being well ventilated to maintain at least slight acidity (pH=4).

3 Claims, 5 Drawing Figures

U.S. Patent  Aug. 14, 1984  Sheet 3 of 3  4,465,594
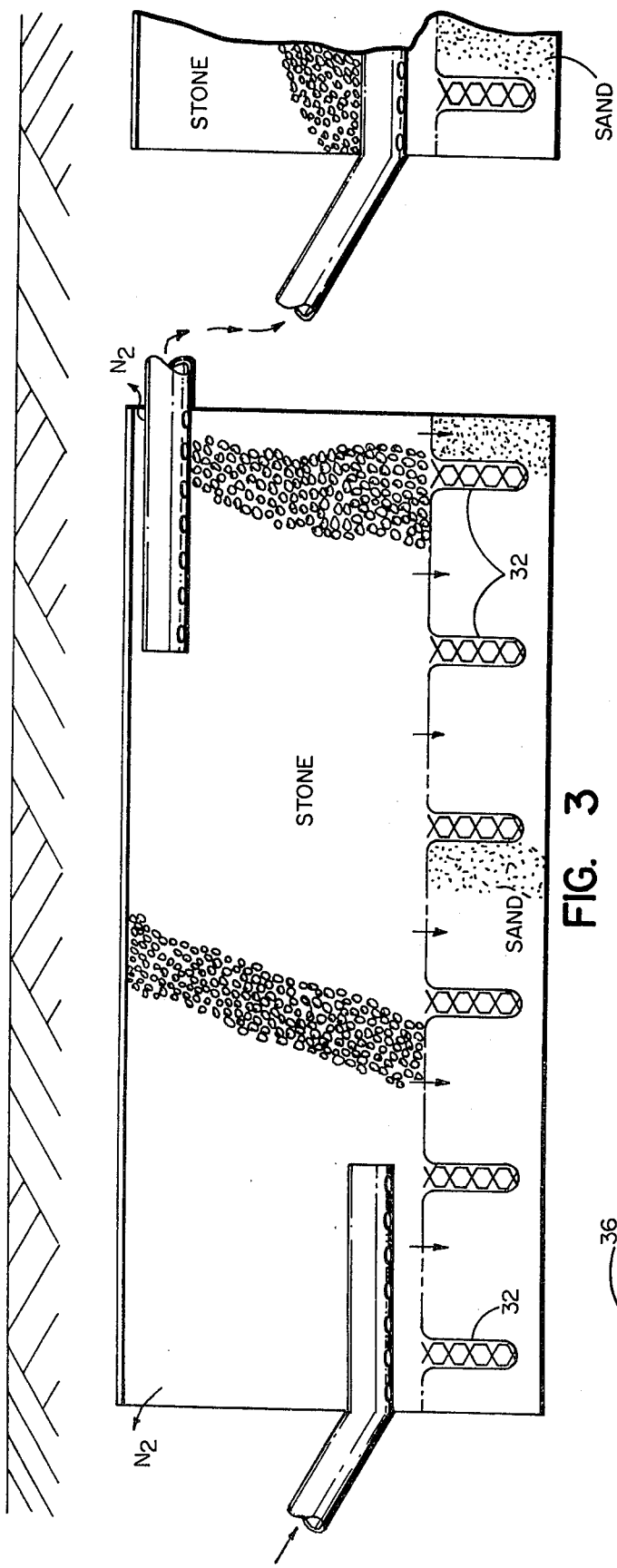
FIG. 3
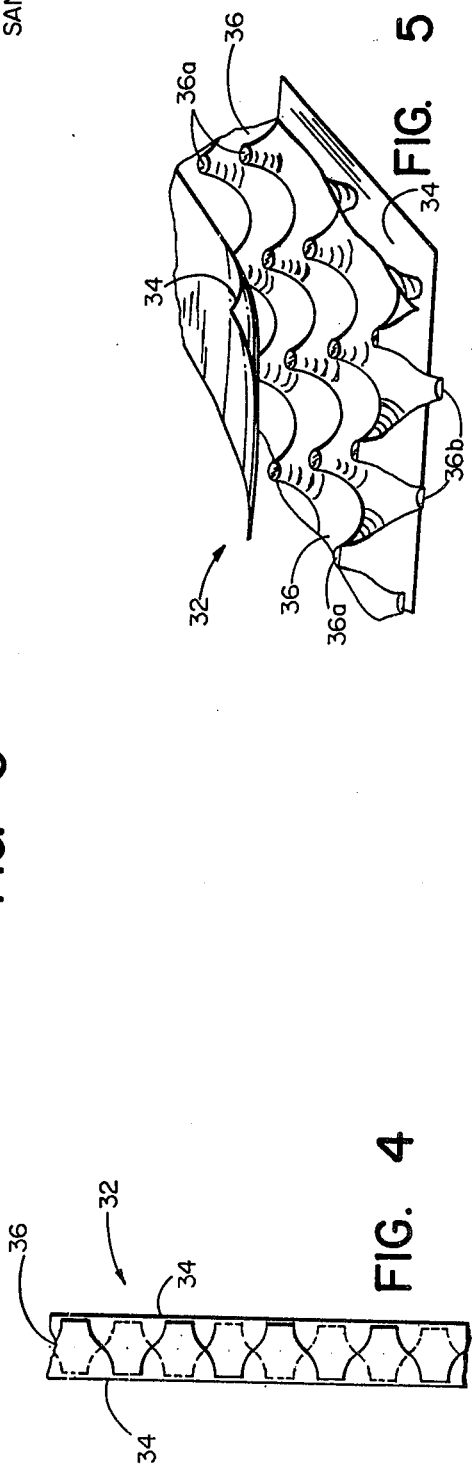
FIG. 5
FIG. 4

SEWAGE SYSTEM FOR THE TREATMENT OF SEGREGATED DOMESTIC WASTE WATER

The present invention relates to a new and novel process for the treatment of domestic sewage, and deals more particularly with a system wherein separate household plumbing drain lines are provided for segregating waste water from toilets, wash basins, showers, bathtubs from the waste water produced from the domestic kitchen and laundry area. The former is referred to herein as black water and the latter as grey water.

Black water contains most of the nitrogen in household waste water (approximately 90 percent) and represents about 30 percent of the total flow from a typical household. Grey water represents about 70 percent of the household flow and contains organic material of the type readily oxidized by bacteria (BOD) and anaerobic matter containing necessary electron donors.

The black water and the grey water are fed to separate septic tanks of suitable capacity. Since the black water contains most of the bioresistant or soil clogging components the black water septic tank is treated through a filter to protect the seepage field. The black water septic tank concentrates waste better than the grey water septic tank, a distinct advantage in overall septage pumping costs to the homeowner.

Filtration means is provided for the nitrification of the black water passing from the septic tank and said means includes alternating layers of sand and stone with water pervious membranes provided below the sand to prevent sand from passing downwardly into the stone layer therebelow. The black water is received in an upper layer of stone and an outlet is provided in a lower layer of sand. Atmospheric vent means is provided for at least the sand layers of the nitrification filter means and serves to ventilate these sand layers in a biological nitrogen oxidation process for the black water, and also achieves significant nitrification by providing a source of atmospheric oxygen such that the black water filtrate is non-alkaline or slightly acidic with a pH of less than 4.

The grey water passes from its septic tank to a denitrification filter means and the black water filtrate in its slightly acidic non-alkaline state is combined with the grey water to take advantage of the organic carbon and electron donors in the grey water in a denitrification stage or filtering step.

The denitrification filter means comprises a series of adjacent anaerobic tanks or trenches. The term reactor will be used herein to encompass either tank or trench. Each tank shown has inlet and outlet means connecting these tanks in series to provide a reductive atmosphere for the black water filtrate and the grey water with which it is combined. The denitrification filter means preferably includes several tanks of the up-flow type in that gravity does provide the water pressure for flow through the overall filter means but within each tank the combined black water and grey water to be filtered pass upwardly through the stone layer or downwardly through a soil layer in a reactor trench. The grey water provides a convenient source of carbon for combining with nitrates in the black water filtrate so that a biological denitrification occurs.

The chief aim of the present invention is to provide a passive nitrogen removal technique in a domestic waste water treatment system especially suitable for use in areas of well drained sandy soil where domestic septic tank effluent can otherwise be a pollutant with nitrates, especially if sufficient dilution is not available from normal ground water flow. The present invention solves this problem by improved filtration means for the black water effluent, and separate treatment of the grey water effluent under anaerobic conditions in a rock filter of the up-flow type or in downflow reactor trench.

The nitrigying process by which the black water is oxidized at a pH of less than 4 also removes phophate pollutants by precipitation.

In the denitrification reactor the slightly acidic black water filtrate is combined with the grey water in proper proportion to provide increased coagulation and floccuation thereby improving the waste treatment process at this stage.

The invention will be further described with reference to the drawings wherein FIG. 1 shows a presently preferred embodiment of the system in schematic fashion.

FIG. 3 shows the denitrification filtration means in greater detail and

FIGS. 4 and 5 illustrate the indrains preferred for both said filter means.

Figure 1:
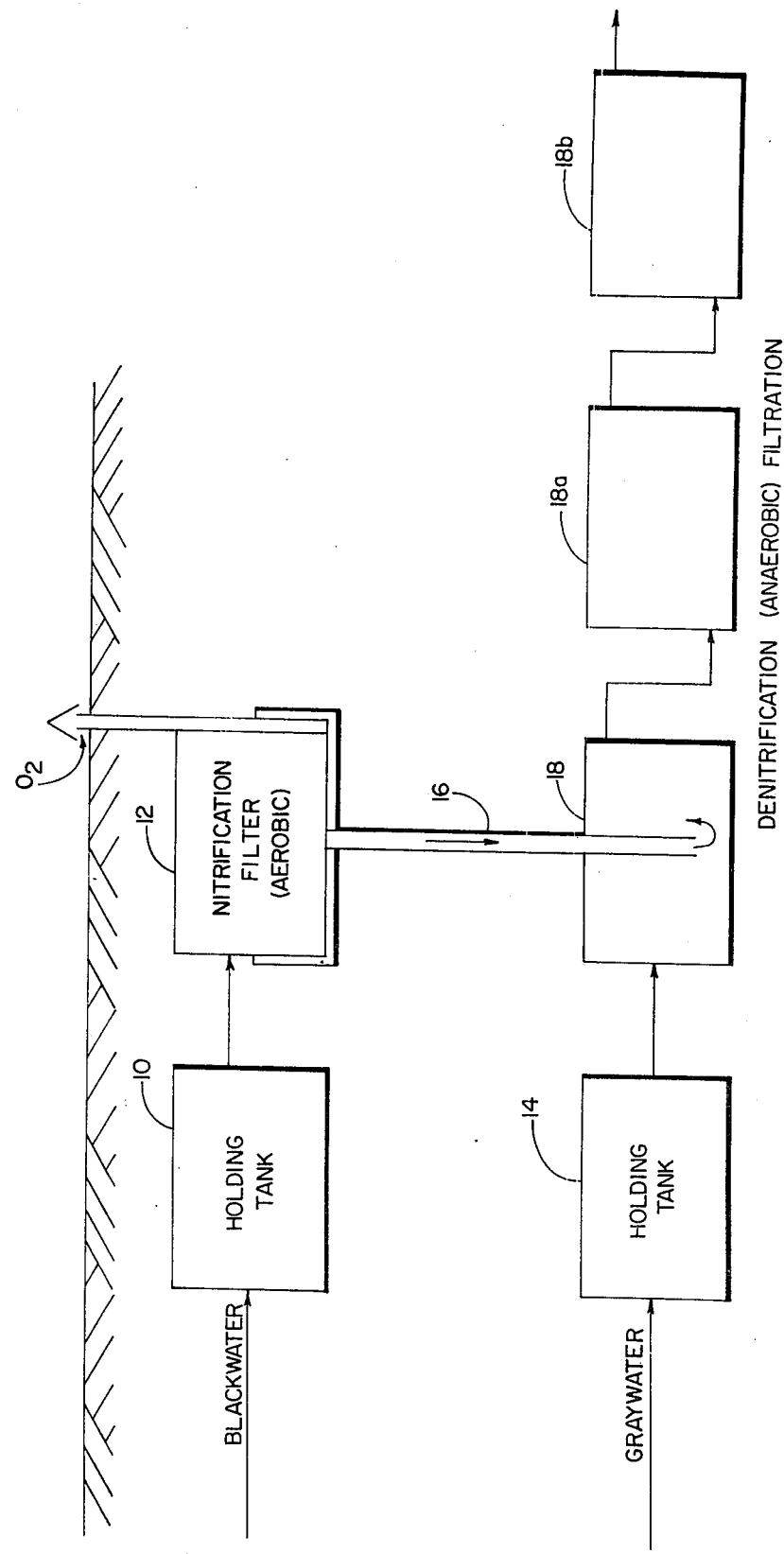

FIG. 1 illustrates diagrametically the system for treatment of domestic waste water wherein the waste water has been segregated by conventional plumbing techniques to provide two drain lines into the two waste streams labelled black water and grey water in this view. The nitrogen rich black water stream is treated in a septic tank 10 and flows into an underdrained aerobic filter means 12 to be described. The remainder of the domestic waste water, containing an abundance of organic carbon and electron donors from the food products and other pollutants, from the domestic dishwasher laundry and kitchen sink, flows into a separate septic tank 14, and it should be noted that each of these separate holding or septic tanks 10 and 14 to serve separate out the solid materials from the waste water and that they do require periodic pumping for removal of these solids. However, the black water tank 10 will accumulate more solids than will the grey water tank 14 with the result that less frequent pumping may be required by the homeowner, assuming that the tanks 10 and 14 are of conventional size to accommodate the total waste water produced.

The black water filtrate from the nitrification filter means 12 flows by gravity through drain 16 into a denitrification filtration system to be described. The first tank filter 18 in this denitrification filtration system receives not only the black water filtrate from pipe 16 but also receives the flow from the grey water septic tank 14. Thus, both waste streams are brought together in the tank 18 where biological denitrification occurs as a result of the lack of oxygen in this portion of the system. Tank 18 comprises an up-flow type filter wherein the liquid is introduced at the lower region of a stone layer and moves upwardly to be discharged in the upper region thereof, and a series of such tanks is preferably provided, as suggested at 18a and 18b, where this procedure is repeated at necessary to filter the water either for reuse in the household for flushing toilets for example, or is allowed to seep into the ground in a relatively clean state. Up-flow reactor trenches can be used also.

The utility of a system of the general type described above was tested in the inventor's home for an extended period of time. The existing septic system was reworked so that the existing tank of 1.9 cubic meters in size was pumped out and a second tank of the same size installed for treating the grey water from the kitchen and laundry. The nitrification filter consisted of a half meter concrete bed of sand with an effective size of 0.16 millimeters and a uniformity coefficient of less than 5. The filter bottom was lined with heavy plastic and the black water filtrate was then fed to a third tank of approximately 3.8 cubic meters in size filled with rocks of 50 millimeters individual size. The tank effluent ran into a conventional seepage bed having a percolation rate of 8 minutes per centimeter and a saturated permeability of $5 \times 10-4$ centimeters per second. The maximum ground water table was about 4 feet from the surface, which surface sloped at approximately 6 degrees. The combined effluent from the grey water septic tank 14 and the black water filtrate in drain 16 required an additional head loss or elevation change of approximately 0.7 meters compared to a standard gravity flow septic tank and seepage field system. The final effluent from the system had a main nitrate content of less than 7 milligrams per liter at 6 degrees centigrade and a TKN of less than 4 milligrams per liter. Tests show that the alkalinity of the black water filtrate was completely exhausted and pH dropped to a level in the range of 3.5 to 4.0. The domestic water supply was tested at the well as having an alkalinity of about 40 milligrams per liter chiefly as calcium carbonates $CaCO_3$ which agrees closely with the mean akalinity values for crystalline bed rock areas. It is expected that black water picks up significantly more alkalinity than does grey water and this is an added advantage to separating the waste waters for individual treatments in accordance with the present invention.

A unique feature of the system is in reliance upon the grey water as a source of carbon for the denitrification filtration in the anaerobic process of denitrification wherein the nitrates are reduced to inert nitrogen gas in a reducing liquid waste of approximately minus 240 millivolts achieved through the normal decomposition of these nitrates in the absence of oxygen. The reaction is represented by the following equation $NO-_3$ plus the carbon source (grey water effluent was found to have a carbon content of 90-180 milligrams per liter and electron donors) leads to the denitrification of bacteria and the production of nitrogen gas plus water ($H_2O$) plus carbon dioxide ($CO_2$) plus cells. The bacteria and fungus use the nitrates as an electron acceptor for organic carbon and other electron donors in the anerobic environment (pH may be above 5.5 and temperature above 10° C.).

Turning next to a more detailed description of the nitrification filter 12 illustrated in the schematic FIG. 1 view it will be apparent that this filter means 12 comprises alternating layers of stone and sand as illustrated at 20 and 22 with a water pervious membrane 24 preferably of non-woven synthetic material provided between the sand and the stone, and more particularly at the interface between the lower region of the sand and the upper region of the stone to prevent the sand from passing downwardly into the stone layer. A similar separator 24 may be provided between the top soil 27 and the top stone layer as shown. Effluent from the black water septic or holding tank 10 enters the upper stone region 20 as shown at 27, and a lower stone layer 28 is provided with a water impermeable plastic liner 30, which liner must be inert at pH of 3.5–4.0. The black water filtrate emanates from the filter means 12 through outlet pipe 16 as shown. A well ventilated system is essential and vent 25 should achieve roughly 3 cubic meters of air for each 2 cubic meters of waste water.

Figure 2:
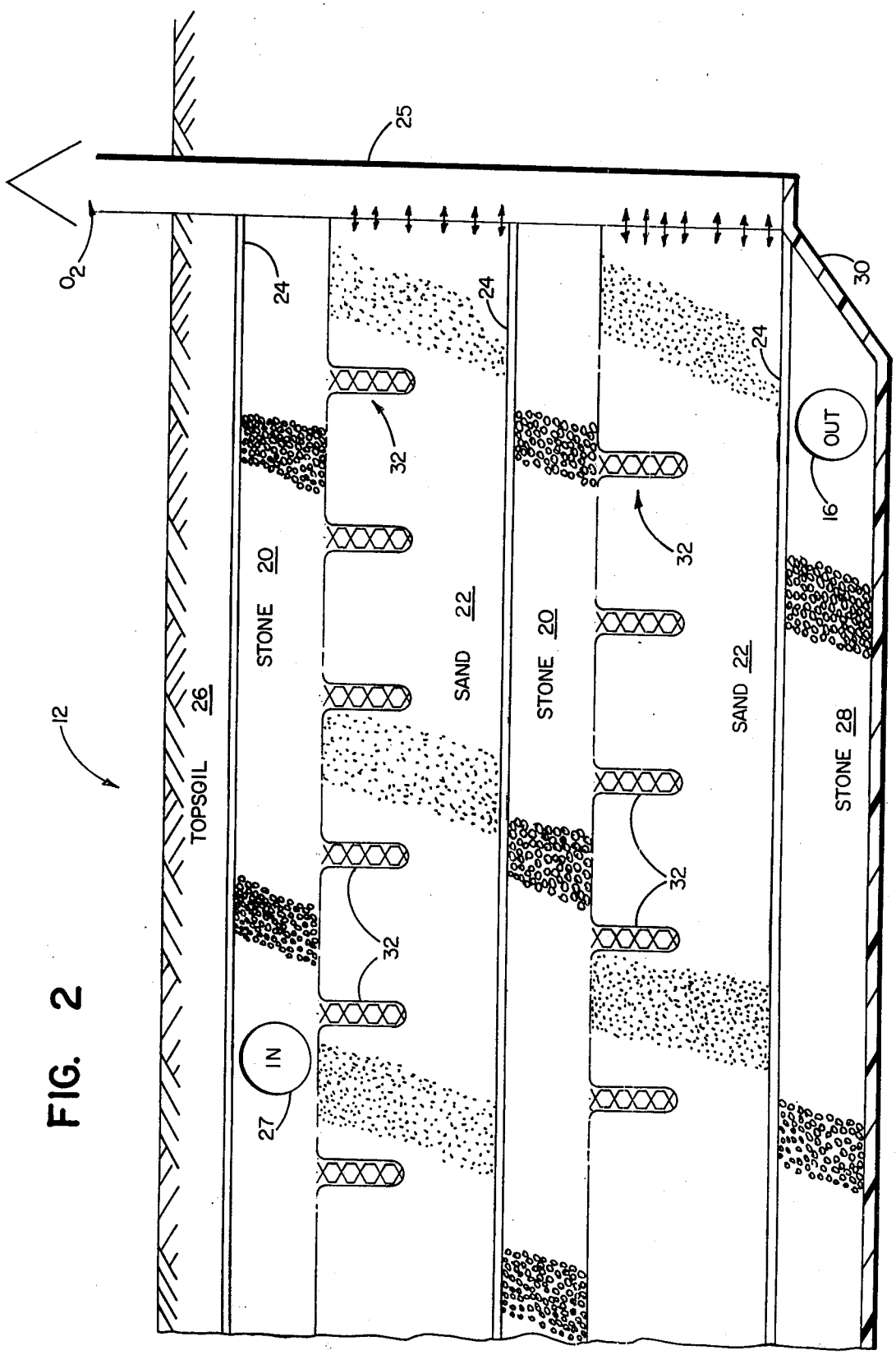
FIG. 2 shows the aerobic nitrification filter of FIG. 1 in greater detail.

It is an important feature of the present invention that each interface between the sand and stone layers of the filter 12 which is not provided with a membrane as shown at 24 does include indrains of the type shown generally at 32, 32 in FIG. 2. Each of these drains comprises side walls of water permeable non-woven synthetic material similar to that of the membranes 24, 24 and preferably said side walls of the wick drains comprise a single sheet of such material wrapped as suggested in FIG. 2 and as shown in FIG. 4, at 34 around an internal core 36 best shown in the exploded view of FIG. 5. As mentioned, the non-woven cover material 34 is preferably similar to that used for the membrane material 24 described previously, and comprises a non-woven synthetic material which is pervious to water but not particularly pervious to sand or top soil and the like. The core material 36 comprises a formed sheet of sytrene plastic or equivalent such that it can withstand the hydraulic forces of the sand material in the filter and keep the layers 34, 34 of the wick drain spaced from one another as required to achieve the rate of flow necessary in a filter such as that depicted in FIG. 1 at 12 or such as depicted in FIG. 3. It will be apparent that the flow of material down through the valleys 36$b$ defined by the raised portions 36$a$ of the core sheet 36 will facilitate the capacity of the filter beyond what might be expected from a conventional sand filter. In a system such as that disclosed above wherein black water is separated from grey water the rate of flow for the black water can be expected to be approximately 20 to 30 gallons per person per day. On the other hand, the rate of flow in the grey water inlet to the system of the present invention may be 10 gallons per person per day. As a result of improving the filter design in the manner just described these rates of flow can be accommodated in a somewhat smaller system than would otherwise be the case.

I claim:

1. In a sewage treatment system of the type wherein human waste and flush water (black water) is segregated from the waste water from laundry and dishwashing waste (grey water) and wherein said segregated black water and grey water are fed to separate septic tanks for each type of waste water, the improvement comprising:

nitrification filter means for receiving black water emanating from said black water septic tank and including alternating layers of sand and stone in said filter means, water pervious membranes below the sand layers to prevent sand from passing downward into said stone layer therebelow, black water inlet means in an upper layer of stone, outlet means in a lower layer of sand, atmospheric vent means for said nitrification filter means to provide atmospheric oxygen to at least the sand layers of said filter means and to ventilate said sand layers by providing a path for nitrogen in the black water, said vent means achieving aerobic nitrification of the black water filtrate and said filtrate being non-alkaline or slightly acidic with a pH of less than 4, denitrification filter means for receiving the grey water from said grey water septic tank and also the black water filtrate from said nitrification filter means, said denitrification filter means comprising a series of adjacent anaerobic reactor trenches, each reactor trench having inlet and outlet means connecting said reactor trenches in series to provide a reductive atmosphere (anoxic) for the black water filtrate and the grey water, each of said reactor trenches including at least one stone layer with said inlet means provided in a lower region thereof, and soil layers below said stone layers in said reactor trenches, said outlet means provided in an upper region of said reactor trenches in communicating with adjacent reactor trench inlet means whereby denitrification of the combined black and grey water is enhanced due to the combining nitrates from the former and carbon an anaerobic matter from the latter.

2. The combination of claim 1 wherein said reactors are tanks, each reactor tank being of the up-flow type so that water pressure forces through the tank and nitrogen gas is released at the top of each tank.

3. The combination of claim 1 further characterized by indrains at the interface between said sand and stone layers to improve the flow capacity of said nitrification filter means.

* * * * *